(12) United States Patent
Carlson et al.

(10) Patent No.: US 6,590,025 B1
(45) Date of Patent: *Jul. 8, 2003

(54) LATEX COMPOSITIONS HAVING IMPROVED DRYING SPEED

(75) Inventors: Virginia Ann Carlson, NorthWales, PA (US); Ronald Scott Beckley, Gilbertsville, PA (US)

(73) Assignee: Rohm and Haas Company, Philadelphia, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/791,202

(22) Filed: Feb. 13, 1997

Related U.S. Application Data

(60) Provisional application No. 60/012,251, filed on Feb. 26, 1996.

(51) Int. Cl.[7] ............................................. C08L 75/00
(52) U.S. Cl. ........................... 524/507; 522/71; 522/83; 522/84; 522/85; 522/86; 523/402; 523/409; 523/410; 523/411; 523/412; 523/415; 524/556; 524/558; 524/591; 524/612; 524/560; 524/549
(58) Field of Search ................... 524/558, 560, 524/591, 556, 114, 612, 261, 549, 507; 522/71, 83, 84, 85, 86; 523/402, 415, 409, 410, 412, 411

(56) References Cited

U.S. PATENT DOCUMENTS

| | | | | |
|---|---|---|---|---|
| 4,032,487 A | * | 6/1977 | Columbus | 428/442 |
| 4,160,750 A | * | 7/1979 | Columbus et al. | 156/332 |
| 4,240,131 A | * | 12/1980 | Albrecht | 525/526 |
| 4,474,923 A | * | 10/1984 | Keskey et al. | 524/458 |
| 4,508,869 A | * | 4/1985 | Keskey et al. | 524/808 |
| 5,025,049 A | * | 6/1991 | Takarada et al. | 524/91 |
| 5,066,705 A | * | 11/1991 | Wickert | 524/457 |
| 5,105,010 A | | 4/1992 | Sundararaman et al. | 564/252 |
| 5,202,377 A | * | 4/1993 | Thorne et al. | 524/591 |
| 5,276,096 A | | 1/1994 | Serdiuk et al. | 525/123 |
| 5,306,744 A | | 4/1994 | Wolfersberger et al. | 523/201 |
| 5,314,945 A | | 5/1994 | Nickle et al. | 524/507 |
| 5,367,004 A | * | 11/1994 | Barsotti et al. | 523/414 |
| 5,371,148 A | | 12/1994 | Taylor et al. | 525/293 |
| 5,426,142 A | | 6/1995 | Rosano et al. | 524/156 |
| 5,500,253 A | * | 3/1996 | Sandiuja et al. | 427/385.5 |
| 5,587,410 A | * | 12/1996 | Kaniada et al. | 523/410 |
| 5,714,532 A | * | 2/1998 | Osterholtz et al. | 524/114 |
| 5,726,242 A | * | 3/1998 | Kusuoka et al. | 524/839 |
| 5,744,544 A | * | 4/1998 | Dunaway et al. | 524/832 |

FOREIGN PATENT DOCUMENTS

| | | |
|---|---|---|
| DE | 393 454 A1 | 5/1990 |
| EP | 121 083 | 10/1984 |
| EP | 0 313 179 A2 | 10/1987 |
| EP | 0 360 212 A2 | 9/1988 |
| EP | 0 568 803 A1 | 3/1992 |
| EP | 640629 | 3/1995 |
| FR | 2301577 | 9/1976 |
| FR | 2513647 | 4/1983 |
| WO | WO 92/19655 | 11/1992 |
| WO | WO 94/05713 | 3/1994 |
| WO | WO 95/31512 | 11/1995 |

\* cited by examiner

*Primary Examiner*—Judy M. Reddick

(57) ABSTRACT

Disclosed are modified latexes having improved drying speed, comprising a polymer having one or more pendant side chains, such side chain comprising the product of the reaction between a mono- or poly-functional group capable of reacting with an acid or hydroxyl unit, and such units present on the precursor polymer. Such modified latexes are storage-stable one-pack compositions useful alone or in combination in coating applications, or as adhesives, sizing agents, composites, impregnants, castings, caulks, and nonwoven binders. Also disclosed is a method for providing a crosslinked protective coating on a substrate, comprising the steps of: applying a coating of the composition of the present invention to the substrate; and allowing the composition to cure at ambient temperature or greater, or applying radiation to the composition to effect curing.

7 Claims, No Drawings

LATEX COMPOSITIONS HAVING IMPROVED DRYING SPEED

This is a nonprovisional application of prior pending provisional application serial no. 60/012,251 filed Feb. 26, 1996.

BACKGROUND OF THE INVENTION

The present invention relates generally to latex compositions, particularly one-pack storage-stable latex compositions. The present invention is especially useful for latex compositions which are capable of undergoing radiation-curing. Such latex compositions are useful in coatings (especially on wood and wood products, metal, plastic, and leather), adhesives, inks, and caulks. Such compositions exhibit improved dry speed.

Dry speed is an important property in many applications. In the early stages of drying, waterborne latex formulations are soft and tacky, and can therefore be easily damaged. (The faster the dry speed, the faster the hardness develops in the coating, ink, caulk, etc.) Rapid dry speed is particularly important in production lines where faster line speeds lead to higher rates of production. For example, in the printing industry, the dry speed of the ink is critical in maintaining the fastest possible press speeds. Another area where dry speed in critical is waterborne ultraviolet (UV) curable compositions. If the coated composition has not dried sufficiently prior to cure, the application of UV radiation will permanently entrap any water or other solvent still remaining in the film. As many waterborne compositions are milky in the wet state, this permanent entrapment of water can cause the resultant films to appear milky or streaked.

EP 313 179 A2 (Bogdany) discloses a modified latex composition having improved adhesion and drying rates. The modification is the addition of an aromatic or alkyl substituted aromatic polyisocyanate to the latex shortly before application of the composition to the substrate. Such composition is useful for forming a coating on a primary carpet substrate, or for other adhesive applications.

A significant drawback to Bogdany is the short pot life of the modified latex composition. Bogdany teaches that the polyisocyanate should be added just before application of the composition to an appropriate substrate in order to control the increase in viscosity of the resulting composition. This is due primarily to the well-known propensity of isocyanates to react prematurely with the latex, and to "gel out" while still in the container.

What is desired, then, is an one-pack, storage-stable latex composition having improved drying speed.

STATEMENT OF THE INVENTION

One aspect of the present invention is directed to a modified latex having improved drying speed, comprising a polymer having one or more pendant side chains, such side chain comprising the product of the reaction between a mono- or poly-functional group capable of reacting with an acid or hydroxyl unit, and such units present on the precursor polymer.

Another aspect of the present invention is directed to a method for providing a crosslinked protective coating on a substrate, comprising the steps of: applying a coating of the composition of the present invention to the substrate; and allowing the composition to cure at ambient temperature or greater, or applying radiation to the composition to effect curing.

DETAILED DESCRIPTION OF THE INVENTION

As used in this specification, the following terms have the following definitions, unless the context clearly indicates otherwise. "Latex" or "latex composition" refers to a dispersion of a water-insoluble polymer which may be prepared by conventional polymerization techniques such as, for example, by emulsion polymerization. "Precursor latex" or "precursor latex composition" refers to the latex of the present invention prior to addition of the pendant side chains. "Crosslinkable" and "crosslinking" refer to the formation of new chemical bonds between existing polymer chains, and "curing" refers to the crosslinking polymers after application to the substrate. "Storage-stable" refers to a composition wherein the reactive components do not substantially crosslink within the storage container itself, even after prolonged storage. "Pot life" or "shelf life" refers to the period of time a composition is storage-stable. "Two-pack" or "two-component" refers to coating compositions (or systems) wherein the components are stored separately, then are mixed together just before use; on the other hand, "one-pack" or "one-component" refers to coating compositions wherein the components are stored in one container. Ranges specified are to be read as inclusive, unless specifically identified otherwise.

In the present invention, the precursor latex compositions of the present invention include but are not limited to: acrylic emulsions, vinyl addition emulsions, polyurethane emulsions, styrene butadiene emulsions, alkyd emulsions, epoxy emulsions, polyether emulsions, polyester emulsions, polyurea emulsions, and combinations thereof (e.g. acrylic/polyurethane hybrid emulsion or blend). These polymers may be single or multi-staged latex particles. Multi-staged latex particles will comprise at least two mutually incompatible copolymers having any of a number of morphological configurations, for example: core/shell; core/shell particles with shell stages incompletely encapsulating the core; core/shell particles with a multiplicity of cores, interpenetrating network particles; and the like, where the greater portion of the surface area of the particles will be occupied by at least one outer stage, and the interior of the particle will be occupied by at least one inner stage.

The present invention is particularly applicable to radiation-curable polymers. Examples of anionically stabilized, radiation-curable polymers useful in the present invention include but are not limited to those disclosed and described in: U.S. Pat. No. 4,287,039 (Buethe, et al.), DE 4,011,353 and DE 4,011,349 (Kressdorf et al.), DE 4,031,732 and DE 4,203,546 (Beck et al.), EP 399,160 (Flakus, W.), EP 392,552 (Haberle et al.), EP 518,020 (Flakus), CA 2,07,097 (Mexiner, et al.), U.S. Pat. No. 5,306,744 (Wolfersberger et al.), U.S. Pat. No. 4,730,021 (Zom et al.), U.S. Pat. No. 4,107,013 (McGinniss et al.), and EP 442,653 (Pears, et al.). The contents of these patents are hereby incorporated by reference herein.

Depending on the particular use, the precursor latex compositions of the present invention will generally contain between 10 wt % and 70 wt % of polymer solids. For coating applications, it is preferred to use between 20 wt % and 50 wt % of polymer solids, most preferably between 25 wt % and 50 wt %.

The side chains of the modified latex of the present invention comprise any mono- or poly-functional group capable of reacting with an acid or hydroxyl unit. Such side chains are attached to the precursor polymer by reaction of the mono- or poly-functional group with acid or hydroxyl units present on the precursor polymer. Such groups include but are not limited to mono- or poly-functional: aziridines, carbodiimides, isocyanates, epoxies, epoxysilanes, aminoplasts, and oxazoline. Such compounds include but are not limited to: 1-aziridinepropanoic acid, 2-methyl, 2-ethyl-2-[3-(2-methyl-1-aziridinyl)-1-oxopropoxylmethyl]-1,3propanediylester octyl isocyanate, and glycidoxypropyl(trimethoxysilane). It is preferred to use materials that are easily incorporated into the emulsion such as epoxysilanes, carbodiimides and aziridines.

The side chains are added to the precursor latex using methods known to those skilled in the art. The simplest method is to blend an appropriate amount of the side chain functionality with the appropriate amount of precursor latex with stirring, and then allow the mixture to react for a period of time, typically 24–48 hours. Depending on the type of side chain functionality being attached, and the particular use for the resultant latex, the side chain functional group will be added to the precursor latex in an amount between 1 and 20 wt %, based on the total weight of the polymer, preferably between 2.5 and 10%.

Surfactants are commonly used in emulsion or dispersion polymerization to provide stability, as well as to control particle size. Conventional surfactants include anionic or nonionic emulsifiers or their combination. Typical anionic emulsifiers include but are not limited to: alkali or ammonium alkyl sulfates, alkyl sulfonates, salts of fatty acids, esters of sulfosuccinic acid salts, alkyl diphenylether disulfonates, and salts or free acids of complex organic phosphate esters. Typical nonionic emulsifiers include but are not limited to: polyethers, e.g. ethylene oxide and propylene oxide condensates which include straight and branched chain alkyl and alkylaryl polyethylene glycol and polypropylene glycol ethers and thioethers, alkyl phenoxypoly(ethyleneoxy) ethanols having alkyl groups containing from about 7 to about 18 carbon atoms and having from about 4 to about 100 ethyleneoxy units, and polyoxy-alkylene derivatives of hexitol, including sorbitans, sorbides, mannitans, and mannides. Surfactants may be employed in the compositions of the present invention at levels of 0.1–3 wt % or greater, based on the total weight of the final composition.

For those compositions which are to undergo radiation curing, the composition may optionally contain an ultraviolet photoinitiator. Such a photoinitiator would generally be used in an amount between 0.2 to 1.0 wt %, based on the total weight of non-volatiles. For those compositions which are to undergo heat curing, the composition may optionally contain a thermal initiator. Such a thermal initiator would generally be used in an amount between 0.5 to 2.0 wt %, based on the total weight of non-volatiles.

Other optional components that can be included in this invention include but are not limited to: co-solvents, pigments, fillers, dispersants, wetting agents, waxes, coalescents, rheology modifiers, thickeners, drying retardants, anti-foam agents, UV absorbers, UV initiators, antioxidants, biocides, and stabilizers. These optional components (as desired) may be added in any order of addition which does not cause an incompatibility between components. Components which do not dissolve in the aqueous carrier (such as pigments and fillers) can be dispersed in the latex or an aqueous carrier or co-solvent using a high shear mixer. The pH of the composition can be adjusted by adding an acid or a base, with agitation. Examples of base include, but are not limited to ammonia, diethylamine, triethylamine, dimethylethanolamine, triethanolamine, sodium hydroxide, potassium hydroxide, and sodium acetate. Examples of acids include, but are not limited to acetic acid, formic acid, hydrochloric acid, nitric acid, and toluene sulfonic acid.

The compositions of the present invention can be used to provide coatings on suitable substrates such as wood and reconstituted wood products, concrete, asphalt, fiber cement, stone, marble, clay, glass, plastics (for example, polystyrene, polyethylene, ABS, polyurethane, polyethylene terphthalate, polybutylene terphthalate, polypropylene, polyphenylene, polycarbonate, polyacrylate, PVC, NORYL®, and polysulfone), paper, cardboard, and metal (ferrous as well as non-ferrous).

The compositions of the present invention can be applied to desired substrates using conventional application techniques such as conventional or airless spray, roll, brush, curtain, flood, and dip-coating methods. Once applied to the substrate, the compositions can be cured at ambient or elevated temperatures, or by applying radiation.

Besides coating applications, the compositions of the present invention can be used alone or in combination with other components to provide, for example, adhesives, inks, sizing agents, composites, impregnants, castings, caulks, and non-woven binders.

In the following Examples 1–9, the drying speeds of various latexes, with and without the side chain functional groups of the present invention, are compared. The precursor latexes used in these Examples are described below.

Latex A is LUHYDRAN® A 848s, a self-crosslinkable acrylic emulsion available from BASF (Ludwigshafen am Rhein, Germany).

Latex B is Q-THANE® QW 18-1, an aliphatic polyurethane dispersion available from K J Quinn (Seabrook, N.H.).

Latex C is VINAMUL® 3695, a vinyl acetate emulsion available from Nacan Products Ltd. (Brampton, Ontario, Canada).

Latex D is HYCAR® 2671, a self-crosslinkable acrylic emulsion available from BF Goodrich (Cleveland, Ohio).

Latex E is a radiation-curable acrylic emulsion, formed by making a two stage polymer of overall composition 48 wt % butyl acrylate, 24 wt % styrene, 25.5 wt % methacrylic acid, and 2.5% allyl methacrylate, neutralizing 15% of the acid equivalents with ammonium hydroxide, adding an amount of glycidyl methacrylate corresponding to 74 mole percent of the acid, and reacting at about 80° C. until essentially all the glycidyl methacrylate has reacted. The resulting latex had a solids content of 40.2 wt %, a methacrylate equivalent weight of 592 based on dry polymer (for UV curing), and an acid number of 58 based on dry polymer.

For each sample tested, approximately 3 grams (g) of sample was placed in a tared aluminum weighing pan, and allowed to dry at 77° C. and 50% relative humidity ("RH"). Weight measurements of the samples were taken at timed intervals. Each example was equilibrated at least 3 days prior to testing.

These examples are presented to illustrate further various aspects of the present invention, but are not intended to limit the scope of the invention in any respect.

EXAMPLE 1

Acrylic with Multifunctional Isocyanate

Latex A was compared against Latex A+BAYHYDROL® XP7063 aliphatic polyisocyanate (a polyisocyanate available from Bayer Inc., Pittsburgh, Pa.). The formulations for the test samples are presented in the table below.

|              | 1-A  | 1-B  | 1-C  |
|--------------|------|------|------|
| Latex A (g)  | 45.5 | 45.5 | 45.5 |
| Isocyanate (g) | 0  | 0.5  | 1.0  |
| H$_2$O (g)   | 4.6  | 5.3  | 6.1  |
| % Solids     | 40.0 | 40.0 | 40.0 |
| % Isocyanate | 0    | 2.5  | 5.0  |

The test results, show below, indicate that the addition of the isocyanate improved the drying speed of the latex. After more than 9 hours of drying, Sample 1-B (2.5% isocyanate) had dried 6.6% faster than Sample 1-A (no isocyanate), and Sample 1-C (5% isocyanate) had dried 12.55% faster than Sample 1-A.

| | FORMULATION (% solids) | | |
|---|---|---|---|
| Time (hr) | 1-A | 1-B | 1-C |
| 0.0  | 40.0 | 40.0 | 40.0 |
| 0.08 | 40.2 | 4.02 | 40.2 |
| 0.17 | 40.3 | 40.4 | 40.4 |
| 0.33 | 40.7 | 40.7 | 40.8 |
| 0.50 | 41.1 | 41.2 | 41.3 |
| 0.83 | 41.8 | 42.0 | 42.1 |
| 1.00 | 42.3 | 42.5 | 42.7 |
| 1.50 | 43.5 | 44.0 | 44.2 |
| 2.00 | 44.8 | 45.5 | 45.8 |
| 3.00 | 47.6 | 48.7 | 49.2 |
| 4.08 | 51.1 | 52.5 | 53.5 |
| 5.00 | 54.9 | 56.8 | 58.9 |
| 6.00 | 59.6 | 62.3 | 65.3 |
| 7.00 | 64.3 | 68.0 | 72.1 |
| 9.68 | 81.3 | 86.7 | 91.5 |

EXAMPLE 2

Acrylic with Monofunctional Isocyanate

Latex A was compared against Latex A+octyl isocyanate.

|                     | 2-A  | 2-B   |
|---------------------|------|-------|
| Latex A (g)         | 45.5 | 22.75 |
| Octyl Isocyanate (g)| 0    | 0.25  |
| H$_2$O (g)          | 4.6  | 3.1   |
| % Solids            | 40.0 | 40.0  |
| % Octyl Isocyanate  | 0    | 2.5   |

The test results, shown below, indicate that the addition of the isocyanate improved the drying speed of the latex. After more than 11 hours of drying, Sample 2-B (2.5% isocyanate) had dried 5.68% faster than Sample 2-A (no isocyanate).

| | FORMULATION (% solids) | |
|---|---|---|
| Time (hr) | 2-A | 2-B |
| 0.0   | 40.0 | 40.0 |
| 0.08  | 40.2 | 40.1 |
| 1.00  | 41.7 | 41.8 |
| 2.00  | 43.7 | 44.0 |
| 2.88  | 45.9 | 46.4 |
| 4.03  | 49.1 | 49.9 |
| 5.00  | 52.1 | 53.2 |
| 6.08  | 55.9 | 57.4 |
| 7.00  | 60.0 | 61.9 |
| 7.90  | 64.5 | 67.2 |
| 9.77  | 74.9 | 79.3 |
| 11.52 | 84.9 | 90.1 |
| 11.75 | 86.3 | 91.2 |

EXAMPLE 3

Acrylic with Epoxysilane

Latex A was compared against Latex A+glycidoxypropyl (trimethoxysilane).

|                | 3-A  | 3-B  | 3-C  |
|----------------|------|------|------|
| Latex A (g)    | 45.5 | 45.5 | 45.5 |
| Epoxysilane (g)| 0    | 1.0  | 2.0  |
| H$_2$O (g)     | 4.6  | 6.1  | 7.6  |
| % Solids       | 40.0 | 40.0 | 40.0 |
| % Epoxysilane  | 0    | 5.0  | 10.0 |

The test results, shown below, indicate that the addition of the epoxysilane improved the drying speed of the latex. After more than 9 hours of drying, Sample 3-B (5% epoxysilane) had dried 16.26% faster than Sample 3-A (no epoxysilane), and Sample 3-C (10% epoxysilane) had dried 30.62% faster than Sample 3-A.

| | FORMULATION (% solids) | | |
|---|---|---|---|
| Time (hr) | 3-A | 3-B | 3-C |
| 0.0  | 40.0 | 40.0 | 40.0 |
| 0.57 | 41.0 | 41.3 | 41.4 |
| 1.88 | 43.8 | 44.6 | 45.0 |
| 2.92 | 46.0 | 47.4 | 48.3 |
| 3.73 | 48.2 | 50.3 | 51.7 |
| 4.58 | 50.7 | 53.6 | 55.8 |
| 5.58 | 53.8 | 58.0 | 61.7 |
| 6.53 | 57.4 | 63.1 | 68.6 |
| 7.55 | 61.5 | 69.4 | 77.0 |
| 9.15 | 68.9 | 80.1 | 90.0 |

EXAMPLE 4

Polyurethane Dispersion with Multifunctional Isocyanate

Latex B was compared against Latex B+BAYHYDROL® XP7063 aliphatic polyisocyanate

|                | 4-A  | 4-B  |
|----------------|------|------|
| Latex B (g)    | 50.0 | 50.0 |
| Isocyanate (g) | 0    | 0.44 |
| H$_2$O (g)     | 0    | 0.8  |

-continued

|  | 4-A | 4-B |
|---|---|---|
| % Solids | 35.0 | 35.0 |
| % Isocyanate | 0 | 2.5 |

The test results, shown below, indicate that the addition of the isocyanate improved the drying speed of the latex. After more than 9 hours of drying, Sample 4-B (2.5% isocyanate) had dried 5.14% faster than Sample 1-A (no isocyanate).

| | FORMULATION (% solids) | |
|---|---|---|
| Time (hr) | 4-A | 4-B |
| 0.0 | 35.0 | 35.0 |
| 0.57 | 35.8 | 35.8 |
| 1.88 | 37.7 | 38.0 |
| 2.92 | 39.3 | 39.7 |
| 3.73 | 40.9 | 41.5 |
| 4.58 | 42.4 | 43.2 |
| 5.58 | 44.3 | 45.5 |
| 6.53 | 46.3 | 47.8 |
| 7.55 | 48.6 | 50.7 |
| 9.15 | 52.5 | 55.2 |

EXAMPLE 5

Acrylic with Epoxysilane and Coalescent

Latex A was compared against Latex A+glycidoxypropyl (trimethoxysilane)+ethylene glycol monobutyl ether (coalescent).

|  | 5-A | 5-B* | 5-C** |
|---|---|---|---|
| Latex A (g) | 27.2 | 24.8 | 45.5 |
| Epoxysilane (g) | 0 | 1 | 2.0 |
| H₂O (g) | 2.7 | 4.1 | 7.6 |
| Ethylene glycol monobutyl ether (g) | 1.2 | 1.2 | 2.0 |
| % Solids | 40.0 | 40.0 | 40.0 |
| % Epoxysilane | 0 | 5.0 | 10.0 |

*Polymer + epoxysilane was aged 7 days prior to addition of coalescent
**Epoxysilane added at time of formulation, after coalescent The test results, shown below, indicate that the addition of the epoxysilane improved the drying speed of the coalesced latex (the coalescent may be added either prior to or following the epoxysilane modification). After 10 hours of drying, Sample 5-B (5% epoxysilane, with coalescent added after the epoxysilane modification) had dried 4.65% faster than Sample 5-A (no epoxysilane), and Sample 5-C (10% epoxysilane, with coalescent prior to the epoxysilane modification) had dried 4.41% faster than Sample 5-A.

| | FORMULATION (% solids) | | |
|---|---|---|---|
| Time (hr) | 5-A | 5-B | 5-C |
| 0.0 | 38.5 | 38.5 | 38.5 |
| 0.50 | 39.4 | 39.6 | 39.7 |
| 1.00 | 40.3 | 40.7 | 40.9 |
| 1.50 | 41.3 | 41.9 | 42.1 |
| 2.03 | 42.6 | 43.3 | 43.6 |
| 3.03 | 45.0 | 45.8 | 46.2 |
| 3.83 | 48.2 | 49.1 | 49.7 |
| 5.00 | 53.1 | 54.5 | 55.4 |
| 6.00 | 57.8 | 59.6 | 61.0 |
| 7.07 | 64.6 | 66.7 | 69.0 |
| 8.10 | 72.8 | 74.7 | 77.1 |
| 9.00 | 79.0 | 81.4 | 82.7 |
| 9.90 | 83.5 | 87.2 | 87.2 |
| 10.00 | 83.9 | 87.8 | 87.6 |

EXAMPLE 6

Vinyl Acetate with Epoxysilane

Latex C was compared against Latex C+glycidoxypropyl (trimethoxysilane).

|  | 6-A | 6-B | 6-C |
|---|---|---|---|
| Latex C (g) | 40.0 | 20.0 | 20.0 |
| Epoxysilane (g) | 0 | 0.55 | 1.1 |
| H₂O (g) | 15.7 | 8.7 | 9.5 |
| % Solids | 40.0 | 38.5 | 38.5 |
| % Epoxysilane | 0 | 5.0 | 10.0 |

The test results, shown below, indicate that the addition of the epoxysilane improved the drying speed of the latex. After 10 hours of drying, Sample 6-B (5% epoxysilane) had dried 3.81% faster than Sample 6-A (no epoxysilane), and Sample 6-C (10% epoxysilane) had dried 5.77% faster than Sample 6-A.

| | FORMULATION (% solids) | | |
|---|---|---|---|
| Time (hr) | 6-A | 6-B | 6-C |
| 0.0 | 40.0 | 40.0 | 40.0 |
| 0.50 | 40.9 | 41.1 | 41.3 |
| 1.00 | 41.9 | 42.2 | 42.7 |
| 1.50 | 43.1 | 43.6 | 44.2 |
| 2.03 | 44.4 | 45.0 | 45.9 |
| 3.03 | 46.9 | 48.0 | 49.1 |
| 3.83 | 50.3 | 51.7 | 53.4 |
| 5.00 | 55.6 | 57.5 | 60.6 |
| 6.00 | 60.6 | 63.1 | 67.6 |
| 7.07 | 67.7 | 71.4 | 77.5 |
| 8.10 | 76.2 | 80.9 | 86.8 |
| 9.00 | 83.8 | 89.3 | 93.0 |
| 9.90 | 91.0 | 94.9 | 96.9 |
| 10.00 | 91.8 | 95.3 | 97.1 |

EXAMPLE 7

Acrylic with Multifunctional Carbodiimide

Latex D was compared against Latex D+UCARLINKXL® 29SE (an aliphatic carbodiimide available from Union Carbide Co.; Danbury, Conn.).

|  | 7-A | 7-B |
| --- | --- | --- |
| Latex D (g) | 40.0 | 40.0 |
| Carbodiimide (g) | 0 | 2.08 |
| PM Acetate (g) | 0.95 | 0.0 |
| H$_2$O (g) | 5.3 | 6.5 |
| % Solids | 45.0 | 45.0 |
| % PM Acetate | 2.1 | 2.1 |
| % Carbodiimide | 0 | 5.0 |

The test results, shown below, indicate that the addition of the carbodiimide improved the drying speed of the latex. After more than 10 hours of drying, Sample 7-B (5% carbodiimide) had dried 5% faster than Sample 7-A (no carbodiimide).

|  | FORMULATION (% solids) | |
| --- | --- | --- |
| Time (hr) | 7-A | 7-B |
| 0.0 | 45.0 | 45.0 |
| 0.17 | 45.4 | 45.4 |
| 0.50 | 46.1 | 46.2 |
| 1.00 | 47.2 | 47.2 |
| 2.00 | 49.4 | 49.4 |
| 3.05 | 51.9 | 52.1 |
| 4.82 | 57.0 | 57.8 |
| 6.45 | 62.5 | 64.7 |
| 8.00 | 69.2 | 73.1 |
| 8.93 | 74.3 | 77.7 |
| 10.60 | 82.1 | 86.2 |

EXAMPLE 8

Acrylic with Aziridine

Latex D was compared against Latex D+1-aziridine propanoic acid, 2-methyl, 2-ethyl-2-[3-(2-methyl-1-aziridinyl)-1-oxopropoxyl-methyl]-1,3propanediylester (8-A) or Latex D+Ethylene glycol monopropyl ether (8-B).

|  | 8-A | 8-B |
| --- | --- | --- |
| Latex D (g) | 40.0 | 40.0 |
| Aziridine (g) | 0 | 1.22 |
| Ethylene glycol monopropyl ether (g) | 0.18 | 0.0 |
| H$_2$O (g) | 6.15 | 7.72 |
| % Solids | 44.6 | 44.6 |
| % Ethylene glycol monopropyl ether | 0.4 | 0.4 |
| % Aziridine | 0 | 5.0 |

The test results, shown below, indicate that the addition of the aziridine improved the drying speed of the latex. After more than 10 hours of drying, Sample 8-B (5% aziridine) had dried 11.86% faster than Sample 8-A (no aziridine).

|  | FORMULATION (% solids) | |
| --- | --- | --- |
| Time (hr) | 8-A | 8-B |
| 0.0 | 44.6 | 44.6 |
| 0.17 | 45.0 | 45.0 |
| 0.50 | 45.8 | 45.9 |
| 1.00 | 46.9 | 47.1 |
| 2.00 | 49.4 | 49.4 |
| 3.05 | 52.3 | 52.5 |
| 4.82 | 57.8 | 58.9 |
| 6.45 | 63.3 | 66.7 |
| 8.00 | 68.9 | 77.5 |
| 8.93 | 72.4 | 80.6 |
| 10.60 | 78.4 | 87.7 |

EXAMPLE 9

UV-Curable Acrylic with Epoxysilane

Latex E was compared against Latex E+glycidoxypropyl (trimethoxysilane).

|  | 9-A | 9-B | 9-C |
| --- | --- | --- | --- |
| Latex B (g) | 25.0 | 50.0 | 50.0 |
| Epoxysilane (g) | 0 | 0.61 | 1.01 |
| H$_2$O (g) | 1.6 | 4.3 | 4.9 |
| % Solids | 38.0 | 38.0 | 38.0 |
| % Epoxysilane | 0 | 3.0 | 5.0 |

The test results, shown below, indicate that the addition of the epoxysilane improved the drying speed of the latex. After more than 10 hours of drying, Sample 9-B (3% epoxysilane) had dried 4% faster than Sample 9-A (no epoxysilane), and Sample 5-C (5% epoxysilane) had dried 7.24% faster than Sample 9-A.

|  | FORMULATION (% solids) | | |
| --- | --- | --- | --- |
| Time (hr) | 9-A | 9-B | 9-C |
| 0.0 | 38.0 | 38.0 | 38.0 |
| 0.05 | 38.1 | 38.1 | 38.1 |
| 0.10 | 38.2 | 38.3 | 38.3 |
| 1.00 | 40.3 | 40.5 | 40.6 |
| 1.68 | 42.0 | 42.3 | 42.3 |
| 3.07 | 45.8 | 46.3 | 46.4 |
| 3.62 | 47.5 | 48.1 | 48.3 |
| 5.02 | 52.4 | 53.6 | 54.4 |
| 5.90 | 56.1 | 57.7 | 58.7 |
| 6.50 | 58.5 | 60.8 | 62.2 |
| 7.03 | 61.6 | 64.0 | 65.6 |
| 7.73 | 65.7 | 69.0 | 70.3 |
| 8.22 | 68.7 | 72.3 | 73.9 |
| 8.72 | 72.1 | 75.2 | 77.7 |
| 9.95 | 76.6 | 79.7 | 82.3 |
| 10.28 | 77.3 | 80.4 | 82.9 |

What is claimed is:

1. A modified one-pack, storage-stable latex composition having improved drying speed, comprising an aqueous dispersion of a polymer containing one or more pendant side chains, said one or more side chains being formed by the reaction of a mixture consisting essentially of a precursor polymer having one or more acid or hydroxyl groups, and a functional group on a compound selected from the group consisting of a mono- or poly-functional aliphatic isocyanate and a mono-functional oxazoline; and wherein said precursor polymer is a polymer selected from the group consisting of an acrylic polymer, a vinyl addition polymer, a styrene-butadiene polymer an alkyd polymer, an epoxy polymer, a polyester polymer, a polyurea polymer, and combinations thereof.

2. The modified latex composition of claim 1, wherein the amount of side chain present in the composition is between 1 and 20 wt %, based on the total weight of the polymer.

3. The modified latex composition of claim 2, wherein the amount of side chain present in the composition is between 2.5 and 10 wt %, based on the total weight of the polymer.

4. An aqueous, storage-stable crosslinkable coating composition comprising the modified latex composition of claim 1.

5. An aqueous, storage-stable, radiation-curable coating composition comprising the modified latex composition of claim 1, wherein the polymer comprises a radiation-curable polymer.

6. The composition of claim 1 wherein said reaction to form said side chains results from blending and stirring said mixture and then allowing said mixture to react for a period of 24–48 hours.

7. The composition of claim 1 wherein said aliphatic isocyanate is selected from the group consisting of octyl isocyanate and polymeric hexamethylene diisocyanate.

* * * * *